Nov. 14, 1939.    W. MELLER    2,179,827
CHANGE-SPEED GEAR
Filed March 5, 1935    4 Sheets-Sheet 2
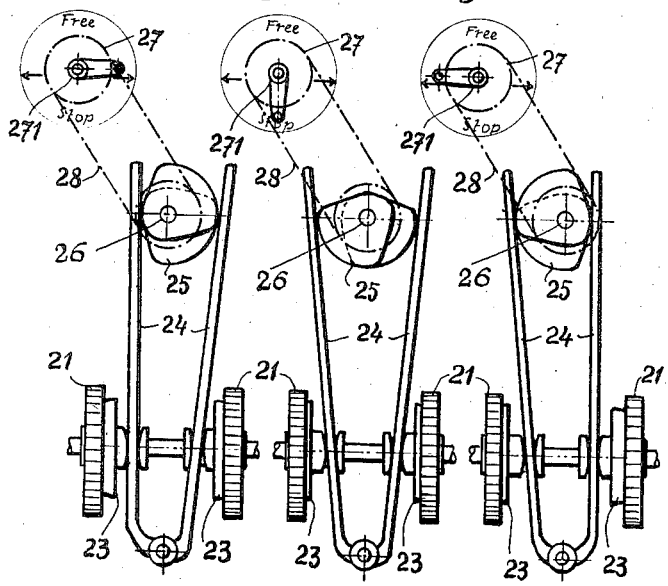
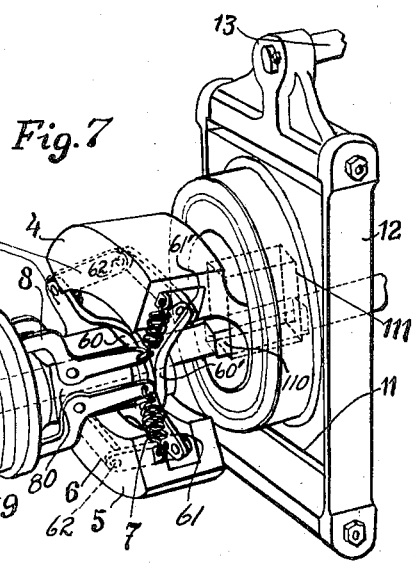
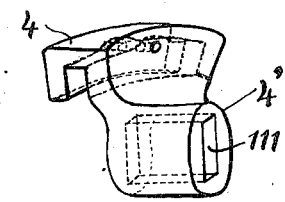

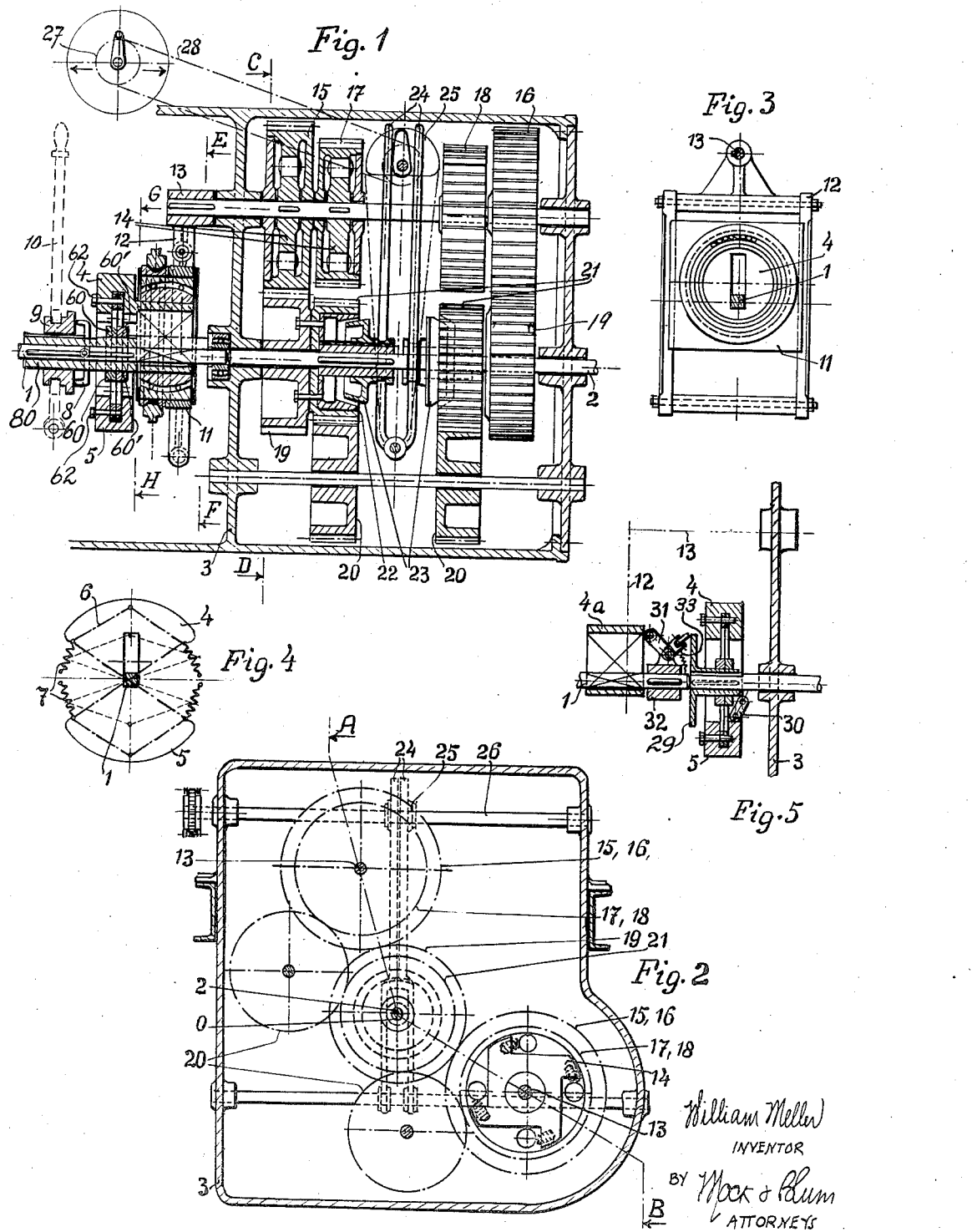

Nov. 14, 1939.   W. MELLER   2,179,827
CHANGE-SPEED GEAR
Filed March 5, 1935   4 Sheets-Sheet 4

William Meller
INVENTOR
BY Mock & Blum
ATTORNEYS

Patented Nov. 14, 1939

2,179,827

UNITED STATES PATENT OFFICE 2,179,827

CHANGE-SPEED GEAR

William Meller, Budapest, Hungary

Application March 5, 1935, Serial No. 9,370
In Germany January 12, 1934

3 Claims. (Cl. 74—117)

This invention relates to a change-speed gear, in which an eccentric or similar driving member, acts upon the driven shaft through one or more swing members or link motions, which are rotatably supported in a stationary position, and of which their oscillating rotary movement, is transmitted to the driven shaft or shafts by means of toothed wheels and ratchet and pawl or similar mechanisms.
The main object of this invention is to provide a change-speed gear which is simple and efficient and has the advantage of being free of vibrations and noises. An essential advantage obtained by my invention is the fact, that any kind of output speed characteristic of the driving engine can be transformed into any other kind of torque-speed characteristic of the driven machine. Furthermore, the invention renders possible a change from forward to backward running, a free running and braking in both directions, a deviation of the centre lines of the driving and driven shafts; the greatest equalizations of irregularities in the drive; the raising or reducing of the speed ratio at will; and finally a construction which economises space and constituents, more particularly owing to the fact that the amplitude of the oscillations is made usable in both directions.

The invention is illustrated by way of example in the accompanying drawings, in which—
Figure 1 shows one example of the invention in longitudinal section, partly on the line A—O and partly on the line B—O in Figure 2;

Figures 2 and 3 are cross sections on the lines C—D, E—F respectively in Figure 1;

Figure 4 is a diagrammatic view of the centrifugal governor and driver;

Figure 5 shows an alternative regulating means as a modification of a detail in the longitudinal section of Figure 1;

Figures 6, 6a and 6b illustrates three different positions of a clutch control mechanism;

Figure 7 shows a perspective and enlarged view of the centrifugal governor and driving member;
Figure 8 shows a centrifugal rock member;

Referring to the drawings—

Figure 9:
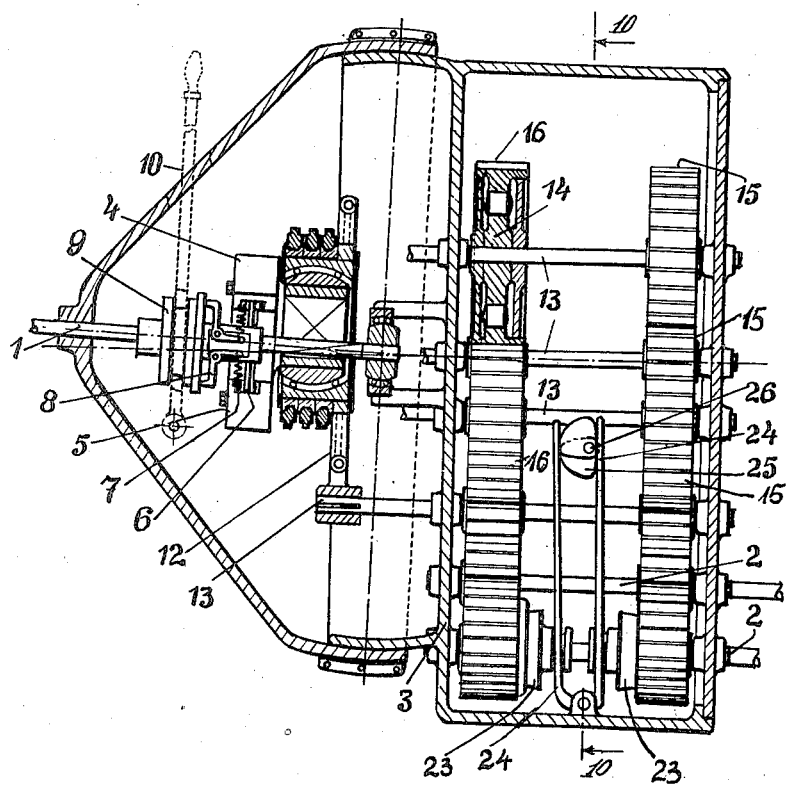
Figure 9 is a sectional sideview of a modified speed gear provided with four driven shafts and drawn on line 9—9, Figure 10.

The driving shaft 1 and the driven shaft 2 are so supported in a casing 3 that an angular deviation between the two is possible. Bearing brasses, sets of balls, lubrication, positioning rings and so forth are for the most part omitted in the drawings for the sake of clearness.

With shaft 1 rotates a centrifugal governor comprising, a centrifugal weight-concentric 4 provided with a rectangular slot 11, Fig. 9, which is connected with a counterpoise 5 by a rod mechanism which is in the nature of a double scissors joint. Said rod mechanism consists of two rings 60, 60' which are loosely arranged in a sleeve 80 keyed on the driving shaft 1 and are provided with lugs 61, 61' (Fig. 7) connected with each other by links 6. The bolts 62 (Fig. 1) connecting the links 6 with each other are inserted through openings in the weight 4 and the counterpoise 5 respectively and hold the parts of the governor together, which is slidably arranged on the square portion 110 of the shaft 1 by means of the rectangular slot 111. The centrifugal force of both members 4 and 5 is opposed by springs 7 one end of which being secured to the members 4 and 5 respectively, the other end being attached to bell-crank levers 8, which are pivotally mounted on said sleeve 80 keyed on the shaft 1. The initial stress of the springs is adjustable by means of the bell-crank levers 8, a slide ring 9 and an adjusting lever 10. To the eccentric 4 of the governor weight 4 is secured a pendulum ball bearing, rotatably held in square block 11, which in its turn moves within a swing member in form of a prismatic guide bar 12, fast to a shaft 13.

During the operation of the centrifugal oscillating mechanism, the weight-eccentric 4, engaging the square of main shaft 1, is constantly kept in rotation. It will be ineffective if its centre line falls together with the centre of the main shaft. If however the speed of this shaft is increased above a maximum, the centrifugal force of the weight-eccentric will overcome that of springs 7. The weight-eccentric is displaced from its central position and a consequent eccentric action on the rock member or frame 12, will oscillate the latter.

To counteract the unbalanced effect on the main shaft, the counter weight 5, interconnected with weight 4', by means of link mechanism 6, will automatically respond and equalize the forces.

To pivot 13 at the centre of oscillation are keyed the ratchet hubs 14, opposed to one another like mirror images, in such a way that they drive toothed wheels 15 and 18 by means of the rollers in one direction of rotation, and drive toothed wheels 16 and 17 in the other direction. The toothed wheels 15 and 16 mesh directly with toothed wheels 19, rotatably mounted upon the driven shaft 2, while the toothed wheels 17 and 18, through the medium of idle reversing wheels 20, act upon rings of teeth 21, which are firmly screwed to clutch members 22 and to the toothed wheels 19. These two methods of transmitting rotation from the oscillating central pivots 13 to the driven shaft 2, which have here been described collectively, are in part superfluous, and, although they are also to be employed in certain cases in the assembly set forth, according to the purpose for which they are to be used, either the toothed wheels 16 and 18 or the toothed wheels 17 and 18, together with the toothed wheels 19 or 20 and 21 meshing therewith at times, and also the clutch member 22, may be omitted for the purpose of saving expense.

The clutch members 23, keyed on to the driven shaft in a longitudinally movable manner, are actuated by switch lever arms 24 and a double cam disc 25, in such a way that upon one or other of them being engaged, Fig. 6, one direction of rotation is attained in each case, while by putting in both a braking action is attained, and by disconnecting both a free running of the driven shaft occurs. This shifting may be controlled by the pivot 26 of the cam disc 25, and by chain wheels 27 and a chain 28 connected to a control shaft 271, from any convenient place outside the coupling. Control shaft 271, or the cam shaft 26, are capable of actuating other members, as for instance independent brakes, regulating members of the driving engine and so forth, as well as the adjusting lever 10. The number of oscillating members, which may be freely selected, and the angle of the mid positions A—O and B—O of the oscillating members in relation to the main axes, that is to say, asymmetrical arrangement of the swinging members or the central pivots thereof, in relation to one another and in relation to the main axes of the primary and secondary shafts, as well as the distances A—O and B—O and the transmission ratios (numbers of teeth) of the toothed wheels, admit of being advantageously determined on account of the drive being non-uniform, by analyzing the same into components on the mathematical principle of Fourier.

In the case illustrated in Figs. 1 to 4 and 7 to 10, the transmission is regulated by the changes in speed of revolution of the driving shaft. If, however, the regulating is to be effected in dependence upon the speed of revolution of the driven shaft, the centrifugal governor 4 to 8 is arranged (Fig. 5) on this shaft, whereas the eccentric, which formerly consisted of one piece, with the governor weight, in this case remains an independent part 4a upon the driving shaft. The deflection of the weight 4 displaces, by means of a lever 30, a disc 29 slidably arranged upon the driven shaft, whereby the bell-crank lever 31, which is rotatably mounted upon the hub 32 keyed to the driving shaft 1, increases or diminishes the eccentricity of the eccentric 4a according to the purpose for which it is to be employed. A spring 33, one end of which being connected with the bell-crank lever 31, the other end of which being attached to the hub 32, urges the lever 31 positively against said disc 29. The other parts of the device are the same as those shown in Figs. 1 to 4.

Figure 10:
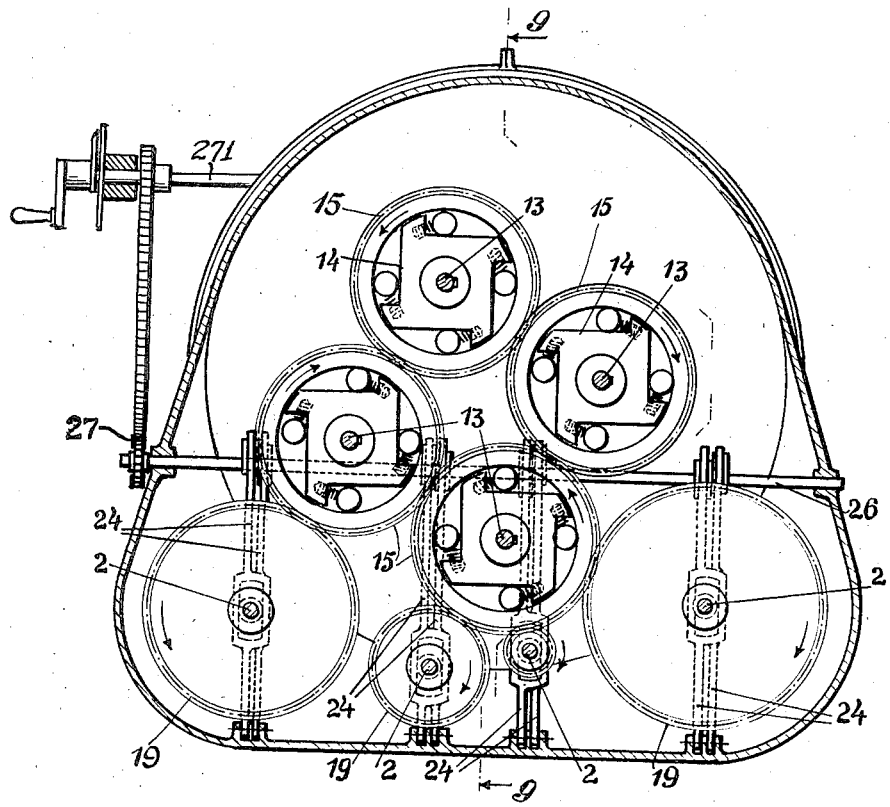
Figure 10 is a sectional plan view of same on line 10—10, Figure 9.

If a plurality of shafts are to be driven at the same time, Figs. 9 and 10 the hubs 14 upon every other central oscillation pivot 13, which here can only be employed in an even number, are oppositely keyed on, and all the toothed wheels 15 are so arranged as to mesh with one another in succession. The toothed wheels 16 are arranged in the same way but rotate in the opposite direction. The toothed wheels 19 may now mesh in pairs, to any desired number, only limited by the space available, with each of the pairs of toothed wheels 15 and 16, the control members admitting of being employed either individually for each shaft 2 or else coupled together, and being mounted on every other central swing pivot, to correspond to cam discs 25 reversed like mirror images. The employment of differently designed elements, such for example as toothed wheels with inclined or arrow-shaped teeth, centrifugal regulators of other types, and so forth, does not in any way affect the principle of the invention.

What I claim is:

1. A change-speed gear, comprising a driving shaft, a driven shaft, a drive of a crank type set in rotation by the driving shaft, means for regulating the throw of the crank-type drive, at least two rock shafts, rocking members mounted fast, one on each rock shaft, two transmitting wheels mounted loose upon each rock shaft, two ratchet mechanisms adapted to communicate rotary motion from each rock shaft to the transmission wheels, one of these ratchet mechanisms rotating one of the said wheels when the shaft is oscillating in one direction and the other ratchet mechanism rotating the other wheel when the rock shaft is oscillating in the other direction, and engageable and disengageable coupling means for communicating rotary motion from the said wheels to the driven shaft.

2. A change-speed gear as claimed in claim 1, further comprising a single manipulating organ, such as a gear lever, for engaging and disengaging the said coupling means.

3. A change-speed gear as claimed in claim 1, the coupling means being adapted to produce a braking action by coupling the driven shaft to both the transmission wheels at the same time.

WILLIAM MELLER.